United States Patent
Novozhenets

(10) Patent No.: US 11,062,543 B2
(45) Date of Patent: Jul. 13, 2021

(54) ON-DEMAND CREDENTIAL FOR SERVICE PERSONNEL

(71) Applicant: CARRIER CORPORATION, Palm Beach Gardens, FL (US)

(72) Inventor: Yuri Novozhenets, Pittsford, NY (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 17 days.

(21) Appl. No.: 16/192,294

(22) Filed: Nov. 15, 2018

(65) Prior Publication Data

US 2019/0180535 A1 Jun. 13, 2019

Related U.S. Application Data

(60) Provisional application No. 62/597,135, filed on Dec. 11, 2017.

(51) Int. Cl.
*G07C 9/27* (2020.01)
*G07C 9/00* (2020.01)
(Continued)

(52) U.S. Cl.
CPC ............ *G07C 9/27* (2020.01); *G06F 11/0706* (2013.01); *G06F 11/0751* (2013.01);
(Continued)

(58) Field of Classification Search
CPC ...... G07C 9/00309; G07C 2009/00793; G07C 9/00571; G07C 9/28; G07C 9/27; G07C 2209/63; G07C 9/00904; G07C 2009/00769; G07C 2009/00865; G07C 9/00174
(Continued)

(56) References Cited

U.S. PATENT DOCUMENTS 8,150,374 B2   4/2012   Lowe
8,902,042 B2 * 12/2014   Davis ................ G07C 9/00182
                                                        340/5.73
(Continued)

FOREIGN PATENT DOCUMENTS

WO    2016089841 A1   6/2016

OTHER PUBLICATIONS

Anonymous, "Mobile Credential", URL Online Retrieved :<http://mcdsolutions.biz/wp-content/uploads/2016/06/mobile-credential.pdf>, 7 pages.
(Continued)

*Primary Examiner* — Mirza F Alam
(74) *Attorney, Agent, or Firm* — Cantor Colburn LLP

(57) ABSTRACT

A credential assigning system is provided for deployment with respect to a structure in which an appliance is disposed and in which an access restricting element is disposed to prevent access to the appliance. The credential assigning system includes a credentialing service configured to issue a credential to a user upon a request for the credential being received thereby and a monitoring unit. The credential is usable by the user in causing the access restricting element to permit access to the appliance for the user. The monitoring unit is configured to receive a fault raised by the appliance and to transmit the request for the credential to the credentialing service in accordance with the fault.

13 Claims, 2 Drawing Sheets

(51) Int. Cl.

| | |
|---|---|
| *G06F 21/45* | (2013.01) |
| *H04L 29/06* | (2006.01) |
| *H04W 12/06* | (2021.01) |
| *H04W 12/08* | (2021.01) |
| *G06F 11/07* | (2006.01) |
| *G06F 21/60* | (2013.01) |
| *G06F 21/33* | (2013.01) |
| *G06F 21/64* | (2013.01) |
| *G07C 9/21* | (2020.01) |

(52) U.S. Cl.
CPC .............. *G06F 21/33* (2013.01); *G06F 21/45* (2013.01); *G06F 21/604* (2013.01); *G06F 21/645* (2013.01); *G07C 9/00182* (2013.01); *G07C 9/00571* (2013.01); *G07C 9/21* (2020.01); *H04L 63/0853* (2013.01); *H04W 12/06* (2013.01); *H04W 12/08* (2013.01); *G07C 2009/00253* (2013.01)

(58) Field of Classification Search
USPC ....................................................... 340/5.61
See application file for complete search history.

(56) References Cited

U.S. PATENT DOCUMENTS

| | | | |
|---|---|---|---|
| 9,235,204 B2 | 1/2016 | Fries et al. | |
| 9,342,928 B2 | 5/2016 | Rasane et al. | |
| 9,449,448 B2 | 9/2016 | Andersen | |
| 9,449,449 B2 | 9/2016 | Evans et al. | |
| 9,576,255 B2 | 2/2017 | Kalb et al. | |
| 9,753,455 B2 | 9/2017 | Drees | |
| 9,934,635 B2* | 4/2018 | Turner | H04M 15/56 |
| 10,361,880 B1* | 7/2019 | Marcinkowski | G07C 9/00571 |
| 10,484,389 B2* | 11/2019 | Rovito | G05B 15/02 |
| 2002/0095269 A1 | 7/2002 | Natalini et al. | |
| 2013/0297075 A1* | 11/2013 | Land, III | G05B 15/02 700/275 |
| 2014/0236643 A1* | 8/2014 | Comfort | G06F 8/38 705/5 |
| 2015/0271195 A1 | 9/2015 | Lietz et al. | |
| 2015/0302674 A1 | 10/2015 | Kuruba et al. | |
| 2016/0009525 A1 | 1/2016 | Depaola et al. | |
| 2016/0308876 A1* | 10/2016 | Smith, III | H04L 63/102 |
| 2017/0093836 A1 | 3/2017 | Neafsey et al. | |
| 2019/0272487 A1* | 9/2019 | Theus | G06Q 50/163 |
| 2019/0276275 A1* | 9/2019 | Yang | B66B 1/468 |
| 2019/0355076 A1* | 11/2019 | Marcinkowski | G06Q 50/163 |
| 2020/0053092 A1* | 2/2020 | Rovito | G05B 19/042 |

OTHER PUBLICATIONS

Anonymous, "Remote Desktop Manager (Rdm)", Online retrieved Nov. 2018, URL<https://www.cyberark.com/tech-partner-secured/remote-desktop-manager-rdm/>, 1 page.

* cited by examiner

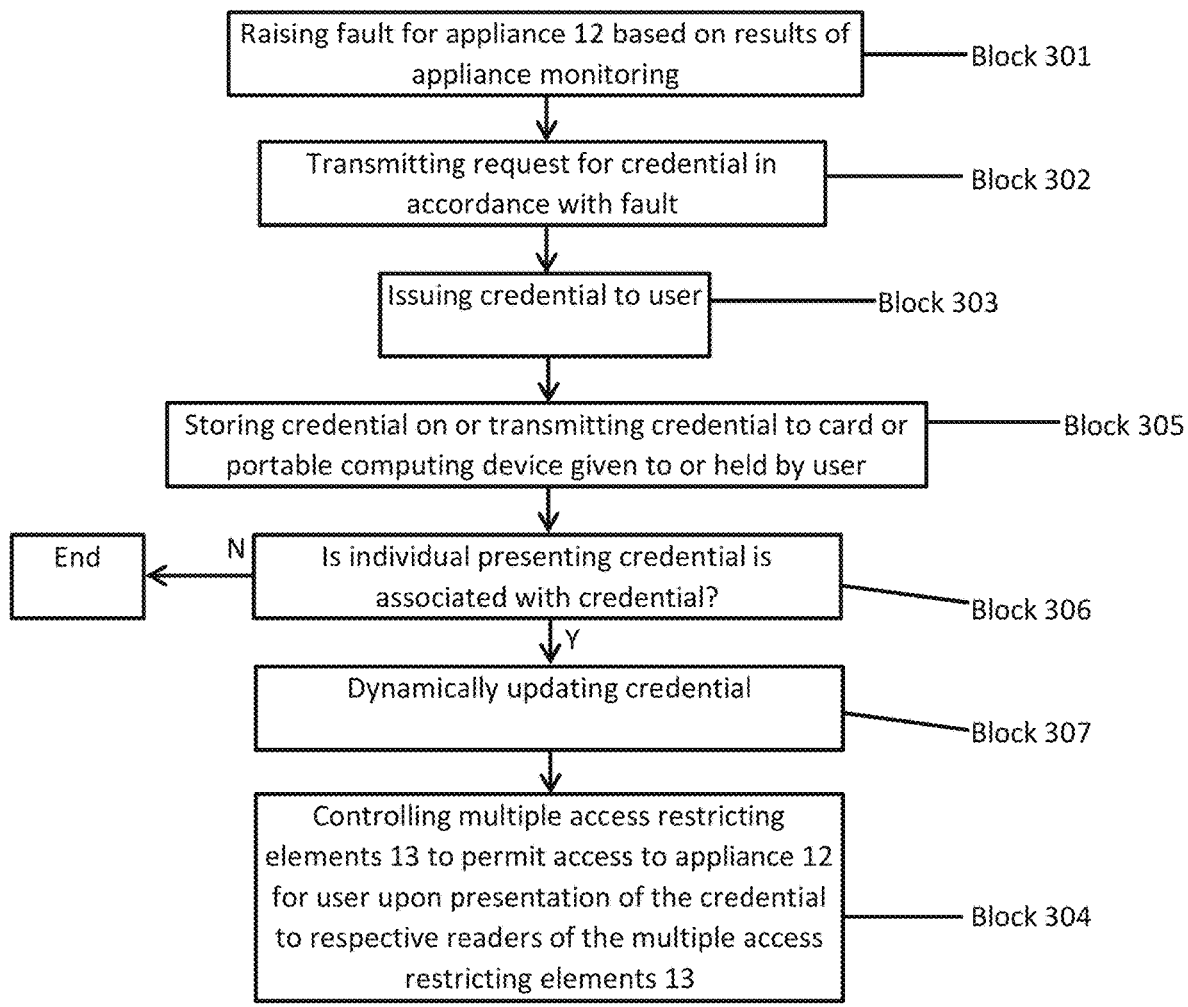

ON-DEMAND CREDENTIAL FOR SERVICE PERSONNEL

CROSS-REFERENCE TO RELATED APPLICATIONS

This application claims the benefit of U.S. provisional application No. 62/597,135 filed Dec. 11, 2017, which is incorporated herein by reference in its entirety.

BACKGROUND

The following description relates to appliance repair or maintenance and, more specifically, to the sending of an on-demand mobile credential to a technician upon the raising of a fault, maintenance or service request of an appliance whereby the technician will have access to the appliance.

When an appliance such as furnace, chiller, elevator, etc., is self-monitored or remotely monitored and thus raises a fault or requires maintenance to be performed by technicians, a property manager or security office must provide the technicians with physical access to the appliance. To this end, several approaches are normally used. In one exemplary case, one or more technicians sign in at a front desk of a property and are subsequently escorted to the location of the appliance. In another case, a service organization is provided with badges that it can distribute to its employees so that the employees can access facilities during off-hours and other times when facility personnel may not be readily available as escorts. In any case, all current approaches are either process and/or resource intensive or possessed of security flaws.

BRIEF DESCRIPTION

According to an aspect of the disclosure, a credential assigning system is provided for deployment with respect to a structure in which an appliance is disposed and in which an access restricting element is disposed to prevent access to the appliance. The credential assigning system includes a credentialing service configured to issue a credential to a user upon a request for the credential being received thereby and a monitoring unit. The credential is usable by the user in causing the access restricting element to permit access to the appliance for the user. The monitoring unit is configured to receive a fault raised by the appliance and to transmit the request for the credential to the credentialing service in accordance with the fault.

In accordance with additional or alternative embodiments, the credential is stored on or transmitted to a card or a portable computing device which is given to or held by the user.

In accordance with additional or alternative embodiments, the access restricting element includes a door which is normally closed and locked to prevent the access to the appliance for the user and which is unlockable and openable to permit the access to the appliance for the user and a door controlling unit comprising a reader and a processor which is configured to unlock the door upon presentation of the credential to the reader.

In accordance with additional or alternative embodiments, the door controlling unit includes an online or offline door controlling unit.

In accordance with additional or alternative embodiments, the door controlling unit is further configured to confirm that an individual presenting the credential to the reader is associated with the credential.

In accordance with additional or alternative embodiments, the access restricting element includes multiple doors respectively coupled to a corresponding one of one or more door controlling units.

In accordance with additional or alternative embodiments, the multiple doors define one or more access pathways between an exterior of the structure and the appliance.

In accordance with additional or alternative embodiments, the credential is configured to permit the access to the appliance for the user along only a portion of the one or more access pathways.

In accordance with additional or alternative embodiments, the credential is dynamically updateable to permit the access to the appliance for the user along only a first portion of the one or more access pathways at a first time and only a second portion of the one or more access pathways at a second time.

According to another aspect of the disclosure, a method of credential assignment is provided for deployment with respect to a structure in which an appliance is disposed and in which an access restricting element is disposed to prevent access to the appliance. The method includes raising a fault for the appliance based on results of appliance monitoring, requesting a credential, which is usable by a user in causing the access restricting element to permit access to the appliance for the user, in accordance with the fault being raised and issuing the credential to the user responsive to the request.

In accordance with additional or alternative embodiments, the method further includes storing the credential on or transmitting the credential to a card or a portable computing device which is given to or held by the user.

In accordance with additional or alternative embodiments, the method further includes controlling the access restricting element to permit the access to the appliance for the user upon presentation of the credential to a reader of the access restricting element.

In accordance with additional or alternative embodiments, the method further includes confirming that an individual presenting the credential to the reader is associated with the credential prior to the controlling of the access restricting element.

In accordance with additional or alternative embodiments, the method further includes defining one or more access pathways between an exterior of the structure and the appliance and disposing multiple access restricting elements along the one or more access pathways to prevent or permit the access to the appliance.

In accordance with additional or alternative embodiments, the method further includes configuring the credential to cause the multiple access restricting elements to permit the access to the appliance for the user along only a portion of the one or more access pathways.

In accordance with additional or alternative embodiments, the configuring of the credential includes dynamically updating the credential to permit the access to the appliance for the user along only a first portion of the one or more access pathways at a first time and only a second portion of the one or more access pathways at a second time.

According to another aspect of the disclosure, a method of credential assignment is provided for deployment with respect to a structure in which an appliance is disposed and in which multiple access restricting elements are disposed to prevent access to the appliance. The method includes raising a fault for the appliance based on results of appliance monitoring, transmitting a request for a credential, which is usable by a user in causing the multiple access restricting elements to permit access to the appliance for the user, wherein the transmitting is from a monitoring unit in accordance with the fault being raised to a credentialing service, issuing the credential to the user from the credentialing service upon receipt of the request thereby and controlling the multiple access restricting elements to permit the access to the appliance for the user upon presentation of the credential to respective readers of the multiple access restricting elements.

In accordance with additional or alternative embodiments, the method further includes storing the credential on or transmitting the credential to a card or a portable computing device which is given to or held by the user.

In accordance with additional or alternative embodiments, the method further includes confirming that an individual presenting the credential to the respective readers is associated with the credential prior to the controlling of the multiple access restricting elements.

In accordance with additional or alternative embodiments, a disposition of the multiple access restricting elements includes defining one or more access pathways between an exterior of the structure and the appliance, disposing the multiple access restricting elements along the one or more access pathways to prevent the access to the appliance and dynamically configuring the credential to cause the multiple access restricting elements to permit the access to the appliance for the user.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 3 is a flow diagram illustrating a method of credential assignment provided for deployment with respect to a structure in which an appliance is disposed and in which an access restricting element is disposed to prevent access to the appliance in accordance with embodiments.

These and other advantages and features will become more apparent from the following description taken in conjunction with the drawings.

DETAILED DESCRIPTION

As will be described below, a system is provided in which an appliance raises a fault to a monitoring system, the monitoring system sends a request for credentials to a credentialing service in accordance with the fault being raised and the credentialing service (or a dispatching system thereof) issues hard or mobile credentials to one or more registered technicians. The hard or mobile credential will then provide for a pathway for the one or more registered technicians to service the appliance. The hard or mobile credential may be issued for a specified period of time based on service agreements or technician availability.

Figure 1:
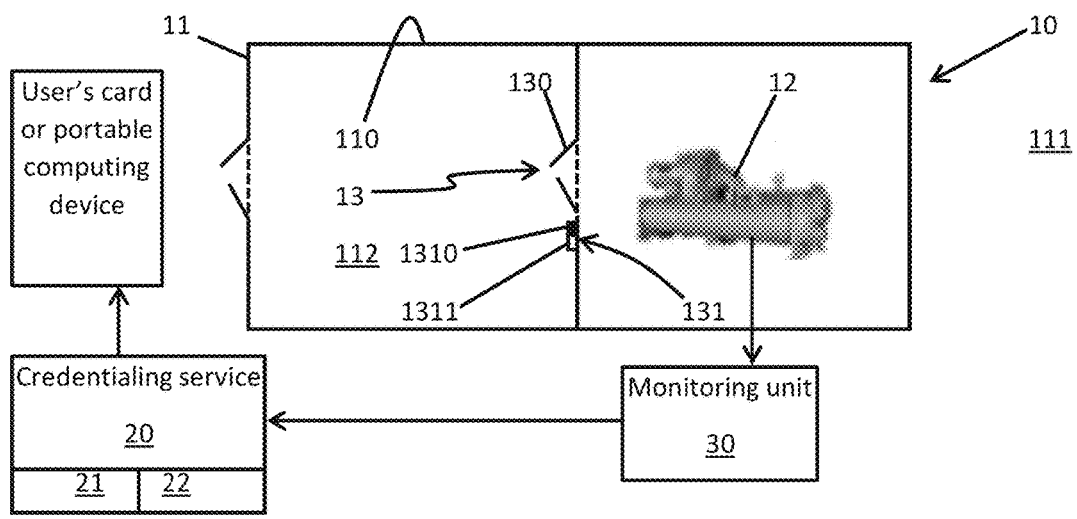
FIG. 1 is a schematic diagram of a credential assigning system in accordance with embodiments.

With reference to FIG. 1, a credential assigning system 10 is provided for deployment with respect to a structure 11. The structure 11 may be a building of various types, a facility of various types or a property. In any case, the structure 11 has an outer boundary 110, such as a wall or a property line that defines an exterior 111 of the structure 11 and an interior 112 of the structure 11. The structure 11 may include an appliance 12, which is disposed in the interior 112, and an access restricting element 13. The appliance 12 may be provided as a furnace, a chiller, an elevator, etc., and may be configured for self-monitoring, for diagnostics and for communication with external devices (i.e., to raise a fault identified from results of the self-monitoring and/or diagnostics). The access restricting element 13 is disposed within the structure 11 to prevent certain types of authorized or unauthorized access to the appliance 12.

In accordance with embodiments, the access restricting element 13 may include a door 130 and a door controlling unit 131. The door 130 may be configured to be normally closed and locked to prevent the access to the appliance 12 but may be unlocked and openable under certain conditions as described herein to permit access to the appliance 12. The door controlling unit 131 may include a reader 1310 and a processor 1311 which is configured to unlock the door 130 so that the door 130 can be opened upon presentation of a credential to be described below to the reader 1310.

In accordance with further embodiments, the door controlling unit 131 may be provided as one or more of an online door controlling unit and an offline door controlling unit. As used herein, an online door controlling unit 131 may be connected to an access control panel or another similar feature, which makes authorization decisions, and an offline door controlling unit 131 makes authorization decisions autonomously.

In accordance with still further embodiments, the processor 1311 may be further configured to confirm that an individual presenting the credential to the reader 1310 is associated with and thus authorized to use the credential (i.e., in the case of the credential being stored on a card, to confirm that the card has not been stolen from an authorized individual by an unauthorized individual by requesting that the unauthorized individual enter a pin number known only to the authorized individual when presenting the credential to the reader 1310).

As shown in FIG. 1, the credential assigning system 10 includes a credentialing service 20 and a monitoring unit 30. The credentialing service 20 may be configured to issue the credential to a user, such as a technician for the appliance, upon a request for the credential being received by the credentialing service 20. The credential is usable by the user in causing the access restricting element 13 to permit access to the appliance 12 for the user. The monitoring unit 30 may be provided as a software component, as a cloud computing element, as an on-premises service or as another similar feature. The monitoring unit 30 is configured to receive a fault raised by the appliance 12 via communications between the appliance 12 and the monitoring unit 30 and to transmit the request for the credential to the credentialing service 20 in accordance with the fault.

In accordance with embodiments, the credentialing service 20 may include a dispatching unit 21 and a database 22. The dispatching unit 21 may be configured to issue the credential to the user by at least one of storing on or transmitting the credential to a card or a portable computing device which is given to or held by the user on a temporary or permanent basis. In the case of the credential being stored on or transmitted to a card, the card may include a transceiver by which signals between the card and the dispatching unit 21 are exchangeable. Alternatively, the card may be printable on-demand at a card printer of the structure 11. In the case of the credential being stored on or transmitted to a portable computing device, the portable computing device may be a smartphone, a tablet or a laptop of the user and may have an application stored thereon which is receptive of the credential and capable of displaying the credential on demand. The database 22 includes a memory unit in which identities of authorized technicians are stored in association with certain types of requests and in association with rules for generating and issuing the credential to the user. For example, for requests having to do with faults raised by a certain type of appliance 12 (i.e., a chiller), the database 22 will provide a list of those technicians who are potential users and who are capable of servicing the chiller as well as rules defining which of those "chiller" technicians is to have the credential issued thereto. The rules may establish priorities of "chiller" technicians, levels of access granted to the "chiller" technicians, availabilities of some "chiller" technicians versus others and the term for which access granted to any "chiller" technician should last. Similar rules would thus be in effect for requests having to do with other types of appliances 12 (i.e., furnaces, elevators, etc.).

The monitoring unit 30 is configured to receive the fault raised by the appliance 12 via the communications between the appliance 12 and the monitoring unit 30, to generate the request for the credential in accordance with or based on the fault and to transmit the generated request for the credential to the credentialing service 20 in accordance with or based on the fault. To this end, the monitoring unit 30 may include a processor and the processor may be configured to initially determine a type of the appliance 12 raising the fault and then to determine the nature of the fault. That is, if the appliance 12 is a chiller rather than a furnace, the request for the credential will be generated by the monitoring unit 30 as a "chiller" request that the database 22 of the credentialing service 20 will associate with certain "chiller" technicians instead of a "furnace" request that the database 22 will associate with certain "furnace" technicians. Meanwhile, if the appliance 12 is a chiller and the nature of the fault is electrical rather than mechanical, the request for the credential will be generated by the monitoring unit 30 as a "chiller, electrical" request that the database 22 of the credentialing service 20 will associate with certain "chiller, electrical" technicians instead of instead of a "chiller, mechanical" request that the database 22 will associate with certain "chiller, mechanical" technicians.

Figure 2:
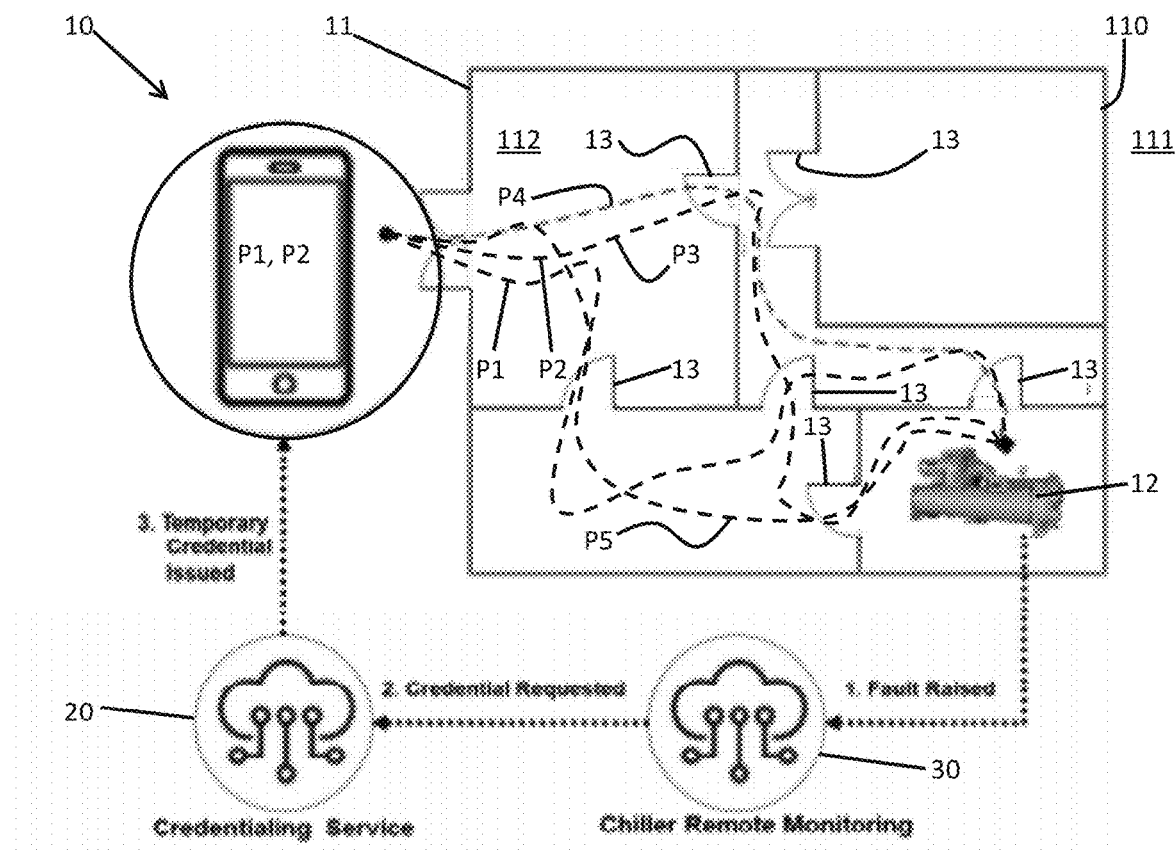
FIG. 2 is a schematic diagram of a credential assigning system in accordance with further embodiments.

With reference to FIG. 2, the credential assigning system 10 is provided for deployment with respect to the structure 11 and the structure 11 includes the appliance 12 disposed in the interior 112 and multiple access restricting elements 13. The multiple access restricting elements 13 are respectively disposed within the interior 112 of the structure 11 to define one or more access pathways P1, P2, . . . , PN between the exterior 111 of the structure 11 and the appliance 12 to prevent certain types of authorized or unauthorized access to the appliance 12 along those one or more access pathways P1, P2, . . . , PN. The multiple access restricting elements 13 may be provided as multiple doors 130 (see FIG. 1) respectively coupled to a corresponding one of one or more online or offline door controlling units 131 (see FIG. 1).

In accordance with embodiments, the credential may be configured to permit the access to the appliance 12 for the user along only a portion of the one or more access pathways P1, P2, . . . , PN. That is, the rules stored in the database 22 of the credentialing service 20 may dictate that a credential issued to a "chiller" technician can only granted the "chiller" technician access to the appliance 12 along only access pathways P1 and P2 so as to provide the "chiller" technician with the easiest, quickest or safest pathway through the structure 11 or, in some cases, to limit the access of the "chiller" technician to some of the more visible or private areas in the structure 11.

In accordance with further embodiments, the credential may be configured to permit the access to the appliance 12 for the user along only a portion of the one or more access pathways P1, P2, . . . , PN and may be dynamically updateable. That is, while the rules stored in the database 22 (see FIG. 1) of the credentialing service 20 may dictate that a credential issued to a "chiller" technician can only grant the "chiller" technician access to the appliance 12 along only access pathways P1 and P2 so as to provide the "chiller" technician with the easiest, quickest or safest pathway through the structure 11 or, in some cases, to limit the access of the "chiller" technician to some of the more visible or private areas in the structure 11, those rules or current conditions may also dictate that the credential can only grant the "chiller" technician ingress access to the appliance 12 along only access pathways P1 and P2 at a first or initial time and then can only grant the "chiller" technician egress access from the appliance 12 only along access pathway P2 at a second or later time. This may be particularly useful during an emergency, such as a fire, in which one or more of the access pathways P1, P2, . . . , PN may be blocked.

With reference to FIG. 3, a method of credential assignment is provided for deployment with respect to the structure 11 in which the appliance 12 is disposed and in which the multiple access restricting elements 13 are disposed along one or more access pathways P1, P2, . . . , PN defined through the structure 11 to prevent access to the appliance 12. As shown in FIG. 3, the method includes raising a fault for the appliance 12 based on results of appliance monitoring (block 301), transmitting a request for a credential, which is usable by a user in causing the multiple access restricting elements 13 to permit access to the appliance 12 for the user (block 302), wherein the transmitting of block 302 is from the monitoring unit 30 in accordance with the fault being raised to the credentialing service 20, issuing the credential to the user from the credentialing service 20 upon receipt of the request thereby (block 303) and controlling the multiple access restricting elements 13 to permit the access to the appliance 12 for the user upon presentation of the credential to respective readers of the multiple access restricting elements 13 (block 304).

In accordance with embodiments, the method may further include storing the credential on or transmitting the credential to a card or a portable computing device which is given to or held by the user (block 305), confirming that an individual presenting the credential to the respective readers is associated with the credential prior to the controlling of the multiple access restricting elements (block 306) and dynamically configuring the credential to cause one or more of the multiple access restricting elements 13 to permit the access to the appliance 12 for the user while other ones of more of the multiple access restricting elements 13 continue to prevent the access to the appliance 12 for the user (block 307).

The systems and methods described herein provide for automation, stream-lining and security for the process of issuing permanent or temporary credentials to service personnel.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A credential assigning system for deployment with respect to a structure in which an appliance is disposed, in which there are multiple access pathways between an exterior of the structure, through an interior of the structure and to the appliance and in which multiple access restricting elements are disposed along the multiple access pathways to prevent access to the appliance, the credential assigning system comprising:
a credentialing service configured to issue a credential to a user upon a request for the credential being received thereby,
the credential being usable by the user in causing the access restricting element to permit access to the appliance for the user; and
a monitoring unit configured to receive a fault raised by the appliance, to determine a nature of the fault and to transmit the request for the credential to the credentialing service in accordance with the nature of the fault,
wherein the credential is dynamically configured to cause the multiple access restricting elements to permit the access to the appliance for the user along only a first portion of the multiple access pathways at a first time for permitting ingress to the appliance and along only a second portion of the multiple access pathways at a second time for permitting egress from the appliance.

2. The credential assigning system according to claim 1, wherein each of the multiple access restricting elements comprises:
a door which is normally closed and locked to prevent the access to the appliance for the user and which is unlockable and openable to permit the access to the appliance for the user; and
a door controlling unit comprising a reader and a processor which is configured to unlock the door upon presentation of the credential to the reader.

3. The credential assigning system according to claim 2, wherein the door controlling unit comprises an offline door controlling unit.

4. The credential assigning system according to claim 2, wherein the door controlling unit is further configured to confirm that an individual presenting the credential to the reader is associated with the credential.

5. The credential assigning system according to claim 2, wherein the multiple access restricting elements comprises multiple doors respectively coupled to a corresponding one of one or more door controlling units.

6. A method of credential assignment for deployment with respect to a structure in which an appliance is disposed, in which there are multiple access pathways between an exterior of the structure, through an interior of the structure and to the appliance and in which multiple access restricting elements are disposed along the multiple access pathways to prevent access to the appliance, the method comprising:
raising a fault for the appliance based on results of appliance monitoring executed by a monitoring unit;
determining a nature of the fault at the monitoring unit;
requesting a credential, which is usable by a user in causing the multiple access restricting elements to permit access to the appliance for the user, in accordance with the nature of the fault being raised by the monitoring unit;
dynamically configuring the credential to cause the multiple access restricting elements to permit the access to the appliance for the user along only a first portion of the multiple access pathways at a first time for permitting ingress to the appliance and along only a second portion of the multiple access pathways at a second time for permitting egress from the appliance; and
issuing the credential to the user responsive to the request.

7. The method according to claim 6, further comprising controlling each of the multiple access restricting elements to permit the access to the appliance for the user upon presentation of the credential to a reader of the access restricting element.

8. The method according to claim 7, further comprising confirming that an individual presenting the credential to the reader is associated with the credential prior to the controlling of the multiple access restricting elements.

9. A method of credential assignment for deployment with respect to a structure in which an appliance is disposed and in which multiple access restricting elements are disposed to prevent access to the appliance, the method comprising:
raising a fault for the appliance based on results of appliance monitoring executed by a monitoring unit;
determining a nature of the fault at the monitoring unit;
transmitting a request for a credential, which is usable by a user in causing the multiple access restricting elements to permit access to the appliance for the user,
wherein the transmitting is from the monitoring unit in accordance with the nature of the fault being raised to a credentialing service;
issuing the credential to the user from the credentialing service upon receipt of the request thereby; and
controlling the multiple access restricting elements to permit the access to the appliance for the user upon presentation of the credential to respective readers of the multiple access restricting elements,
wherein a disposition of the multiple access restricting elements comprises:
defining multiple access pathways between an exterior of the structure, through an interior of the structure and to the appliance;
disposing the multiple access restricting elements along the multiple access pathways to prevent the access to the appliance; and
dynamically configuring the credential to cause the multiple access restricting elements to permit the access to the appliance for the user along only a first portion of the multiple access pathways at a first time for permitting ingress to the appliance and along only a second portion of the multiple access pathways at a second time for permitting egress from the appliance.

10. The method according to claim 9, further comprising storing the credential on a card held by the user.

11. The method according to claim 9, further comprising confirming that an individual presenting the credential to the respective readers is associated with the credential prior to the controlling of the multiple access restricting elements.

12. The credential assigning system according to claim 1, wherein the credential is stored on a card that is printed on-demand by a card printer of the structure to be held by the user.

13. The method according to claim 6, further comprising storing the credential on a card that is printed on-demand by a card printer of the structure to be held by the user.

* * * * *